United States Patent
Murai (10) Patent No.: US 10,532,522 B2
(45) Date of Patent: Jan. 14, 2020

(54) METHOD AND DEVICE FOR MOLDING FIBER-REINFORCED PLASTIC MEMBER

(71) Applicant: MITSUBISHI AIRCRAFT CORPORATION, Aichi (JP)

(72) Inventor: Tomohiro Murai, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 825 days.

(21) Appl. No.: 14/293,230

(22) Filed: Jun. 2, 2014

(65) Prior Publication Data

US 2014/0361467 A1    Dec. 11, 2014

(30) Foreign Application Priority Data

Jun. 6, 2013   (JP) .................. 2013-119361

(51) Int. Cl.
*B29C 70/48*   (2006.01)
*B29C 70/44*   (2006.01)

(52) U.S. Cl.
CPC ............ *B29C 70/48* (2013.01); *B29C 70/443* (2013.01)

(58) Field of Classification Search
CPC ........ B29C 70/48; B29C 70/443; B29C 53/04
See application file for complete search history.

(56) References Cited

U.S. PATENT DOCUMENTS

| 4,065,340 A * | 12/1977 | Dickerson | B29C 35/02 156/154 |
| 4,608,220 A * | 8/1986 | Caldwell | A43B 17/14 264/258 |
| 4,915,896 A | 4/1990 | Rachal et al. | |
| 5,236,646 A * | 8/1993 | Cochran | B29C 70/44 156/286 |
| 5,286,438 A * | 2/1994 | Dublinski | B29C 33/30 264/220 |
| 2006/0125155 A1* | 6/2006 | Sekido | B29C 70/443 264/511 |

(Continued)

FOREIGN PATENT DOCUMENTS

JP        4805375 B2    8/2011

OTHER PUBLICATIONS

Rasmussen, K. J. R., Full-range stress-strain curves for stainless steel alloys, Journal of Constructional Steel Research, vol. 59 (2003), pp. 47-61.*

(Continued)

*Primary Examiner* — Matthew J Daniels
(74) *Attorney, Agent, or Firm* — Pearne & Gordon LLP (57) ABSTRACT

A method for molding a fiber-reinforced plastic member involves disposing a reinforced-fiber base material 2 inside a molding space S, which is created between a mold 1 and a bag film 6, and then depressurizing the inside of the molding space S and curing a resin composition R contained in the reinforced-fiber base material 2, wherein a flat pressure plate 5 made of spring steel is disposed between the reinforced-fiber base material 2 and the bag film 6. The pressure plate 5 elastically deforms along the shape of the reinforced-fiber base material 2 while the inside of the molding space S is being depressurized, and returns to its original flat shape when depressurization is stopped and the bag film 6 is removed after curing of the resin composition R.

11 Claims, 4 Drawing Sheets

(56) References Cited

U.S. PATENT DOCUMENTS

| | | | | |
|---|---|---|---|---|
| 2008/0054523 A1* | 3/2008 | Hanson | ............... | B29C 70/44 |
| | | | | 264/314 |
| 2009/0321978 A1* | 12/2009 | Kurtz | ................. | B29C 33/68 |
| | | | | 264/101 |
| 2010/0108245 A1* | 5/2010 | Nishiyama | .......... | B29C 43/12 |
| | | | | 156/243 |

OTHER PUBLICATIONS

Office Action issued in Patent Application No. JP 2013-119361 dated Feb. 8, 2017.

* cited by examiner

METHOD AND DEVICE FOR MOLDING FIBER-REINFORCED PLASTIC MEMBER

BACKGROUND OF THE INVENTION

Field of the Invention

The present invention relates to a method and device for molding a fiber-reinforced plastic member.

Description of the Related Art

Being lightweight and excellent in mechanical strength, fiber-reinforced plastics (FRPs) are used for structural members of aircrafts, windmill blades, automobiles, marine vessels, railway cars, and the like.

The vacuum assisted resin transfer molding (VaRTM), for example, shown in Japanese Patent No. 4805375 is known as one of the methods for molding a fiber-reinforced plastic member.

The VaRTM method involves covering a fiber base material disposed on a mold with a bag film, which is a covering material, and then depressurizing the inside of the bag film to a predetermined degree of vacuum to thereby inject a resin to the inside of the bag film, and heating and curing the resin impregnating the fiber base material. The VaRTM method can mold a fiber-reinforced plastic member at a lower cost compared to the autoclave molding method, in which a pre-preg covered with a bag film is pressurized and heated and cured at the same time in an autoclave.

Figure 4A:
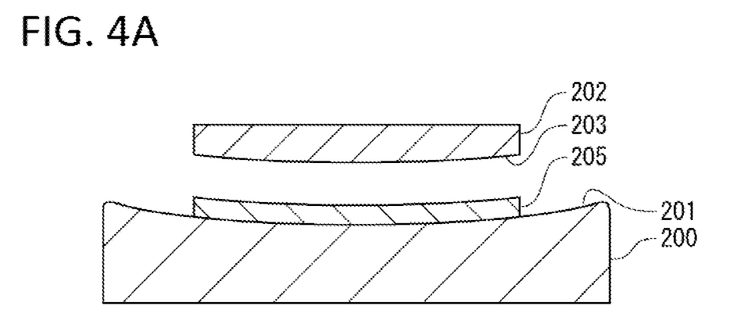
FIGS. 4A and 4B are views showing a molding method using a conventional pressure plate.
Figure 4B:
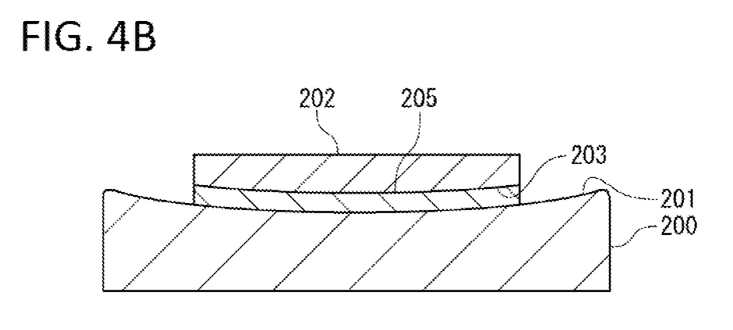

In the VaRTM method, a pressure plate is sometimes interposed between the bag film and the fiber base material. The pressure plate is provided to smooth the surface of the fiber-reinforced plastic member facing the bag film. When the fiber-reinforced plastic member to be molded is flat, a flat plate-like metal material can be used as the pressure plate. However, when the fiber-reinforced plastic member has, for example, an arc-shaped cross-section, the conventional practice is, as shown in FIGS. 4A and 4B, to form a molding surface 201 of a mold 200 facing a fiber-reinforced plastic member 205 into an arc shape, and also form a molding surface 203 of a pressure plate 202 facing the fiber-reinforced plastic member 205 into an arc shape.

The molding surface 203 of the pressure plate 202 is conventionally formed by cutting work of cutting a cold-rolled material, etc. Since the pressure plate 202 needs to be produced so as to have the molding surface 203 which conforms to the cross-sectional shape of the fiber-reinforced plastic member 205, it is necessary to prepare the pressure plates 202 which correspond to the respective fiber-reinforced plastic members 205 with different cross-sectional shapes. This makes the pressure plate 202 manufactured by cutting work expensive, which is a bottleneck in reducing the cost of manufacturing the fiber-reinforced plastic member 205 by the VaRTM method.

The present invention has been made on the basis of this problem, and an object thereof is to provide a method for molding a fiber-reinforced plastic member which can reduce the manufacturing cost of a fiber-reinforced plastic member by keeping down the production cost of the pressure plate.

SUMMARY OF THE INVENTION

A method for molding a fiber-reinforced plastic member of the present invention includes the steps of: disposing a fiber-reinforced plastic raw material inside a molding space, which is created between a mold and a covering material, so as to face the mold, and disposing a flat pressure plate made of spring steel between the fiber-reinforced plastic raw material and the covering material; applying a molding load to the molding space; and curing a resin composition contained in the fiber-reinforced plastic raw material.

Since the pressure plate is constituted of spring steel in the molding method of the present invention, even when the pressure plate is formed in a flat shape, it can elastically deform along the shape of the fiber-reinforced plastic raw material while a molding load is being applied to the inside of the molding space, and can return to its original flat shape when the molding load is released and the covering material is removed after curing of the resin composition. In addition, since the pressure plate is flat, one pressure plate can be commonly used for multiple types of fiber-reinforced plastic raw materials with different shapes. Thus, according to the present invention, the flat pressure plate which requires no cutting work can be commonly used for different types of fiber-reinforced plastic raw materials, which allows a reduction in the production and maintenance costs of the pressure plate and with that a reduction in the manufacturing cost of the fiber-reinforced plastic member.

The molding method of the present invention can be applied not only to the above-described VaRTM method but also to the autoclave molding method.

In the VaRTM method, it is preferable that: a reinforced-fiber base material as the fiber-reinforced plastic raw material is disposed on the mold; the inside of the molding space is depressurized in the step of applying the molding load to the inside of the molding space; and the method further comprises: a resin impregnating step of supplying a fluid resin composition into the depressurized molding space and impregnating the reinforced-fiber base material with the fluid resin composition; and a resin curing step of heating and curing the fluid resin composition.

Also, it is preferable in the autoclave molding method that: a pre-preg, which contains a fiber base material and a matrix resin composition, as the fiber-reinforced plastic raw material, is disposed on the mold; the method further comprises a depressurizing step of depressurizing the inside of the molding space and exhausting the air; and, in the step of applying the molding load to the inside of the molding space and the step of curing the resin composition, the inside of the molding space through the covering material is pressurized, which works as a molding load, and at the same time the matrix resin composition is heated and cured.

In the present invention, the spring steel constituting the pressure plate is preferably a stainless steel having at least one of the following mechanical properties: a yield strength of 500 N/mm$^2$ or higher, a hardness of 300 Hv or higher, and a longitudinal elastic modulus of $180 \times 10^3$ N/mm$^2$ or higher.

The present invention also provides a device for manufacturing a fiber-reinforced plastic member which includes: a mold; a covering material for covering a fiber-reinforced plastic raw material which is disposed so as to face the mold; and a flat pressure plate made of spring steel which is disposed between the fiber-reinforced plastic raw material and the covering material.

According to the present invention, the flat pressure plate which requires no cutting work can be commonly used for different types of fiber-reinforced plastic raw materials, which allows a reduction in the production cost of the pressure plate and with that a reduction in the manufacturing cost of a fiber-reinforced plastic member.

DETAILED DESCRIPTION OF THE PREFERRED EMBODIMENT

In the following, an embodiment according to the present invention will be described in detail with reference to the accompanying drawings.

This embodiment relates to an example of applying the VaRTM method to the present invention.

Figure 1A:
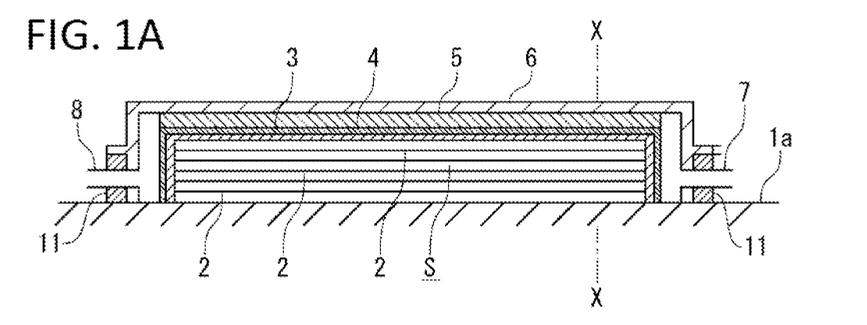
FIGS. 1A to 1C are views illustrating a molding method of an embodiment to which the VaRTM method is applied.
Figure 1B:
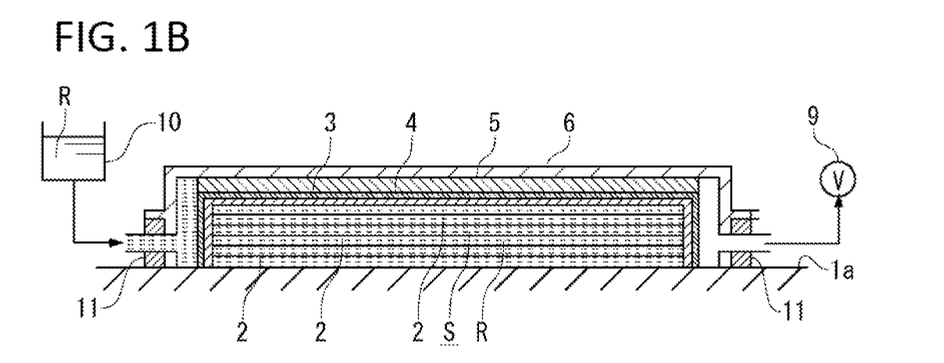
Figure 1C:
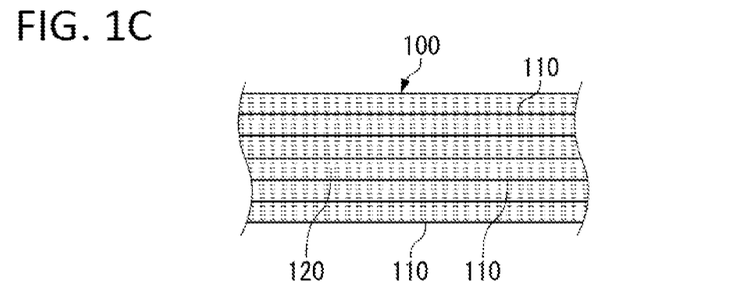

First, a fiber-reinforced plastic member to be molded by this embodiment and its molding method will be outlined with reference to FIGS. 1A to 1C.

As shown in FIG. 1C, a fiber-reinforced plastic member 100 to be molded is constituted of a reinforced-fiber base material 110 and a matrix resin 120 impregnating the reinforced-fiber base material 110. As the fiber constituting the reinforced-fiber base material 110, any publicly-known fiber, for example, carbon fiber, aramid fiber, and glass fiber can be used.

A resin composition R which constitutes the matrix resin 120 may be a composition of a thermosetting resin which cures by being heated, for example, unsaturated polyester, epoxy resin, polyamide resin, and phenol resin, or may be a composition of a thermoplastic resin as represented by nylon, polyethylene, polystyrene, polyvinyl chloride, and polybutylene terephthalate, etc.

The fiber-reinforced plastic member 100 to be formed by the present invention may have any shape. While an example of a plate-like member with a rectangular transverse cross-section is shown here, the present invention can be applied to various forms including a C-shaped cross-section and a T-shaped cross-section, on the premise that the pressure plate 5 to be described later is used for molding.

Next, a procedure for molding the fiber-reinforced plastic member 100 will be described with reference to FIGS. 2A to 2C in addition to FIGS. 1A to 1C.

[Disposing and Covering Step]

As shown in FIG. 1A, sheet-like reinforced-fiber base materials 2 are disposed on top of one another on the mold 1. A release sheet 3 and a pass media 4 are disposed on the reinforced-fiber base material 2 in this order, and a pressure plate 5 is disposed on the pass media 4. Thereafter, the reinforced-fiber base material 2, the release sheet 3, the pass media 4, and the pressure plate 5 are covered with a bag film 6. Disposing a seal member 11 between the periphery of the bag film 6 and an upper surface of the mold 1 creates an enclosed molding space S between the bag film 6 and the mold 1, and the reinforced-fiber base material 2, the release sheet 3, the pass media 4, and the pressure plate 5 are disposed in this molding space S. The bag film 6 includes a suction port 7 and an injection port 8; the suction port 7 is connected with a vacuum pump 9, while the injection port 8 is connected with a storage tank 10 where a liquid resin composition R is stored. Here, the term "composition" shall be used to refer to an uncured state, and be distinguished from a "resin" which has already cured.

The mold 1 is constituted of an iron-based metal material, for example, stainless steel such as JIS SUS304. However, as long as it functions as a mold, any material can be used to constitute the mold 1. As shown in FIG. 2A, a molding surface 1a for molding the shape of the fiber-reinforced plastic member 100 (fiber base material 2) of the mold 1, on which the reinforced-fiber base material 2 is placed, is dented in an arc shape. This molding surface 1a corresponds to the transverse cross-sectional shape of the fiber-reinforced plastic member 100 one wishes to produce. Note that depiction of the release sheet 3 and the pass media 4 is omitted in FIGS. 2A, 2B and 2C to make the description easily understandable.

The release sheet 3 is provided to smooth the surface texture of the fiber-reinforced plastic member 100 as well as to separate the pass media 4, and the pressure plate 5 and the bag film 6 located in the upper layers than the pass media 4 from the molded fiber-reinforced plastic member 100. The release sheet 3 is constituted of a raw material which allows permeation of the resin composition R to be injected into the molding space S and has a smooth flat surface.

The pass media 4 functions as a passage for spreading the injected resin composition R throughout the inside of the molding space S. The pass media 4 is constituted of a mesh sheet.

The pressure plate 5, which is the feature of this embodiment, is constituted of stainless steel having a spring property. As shown in FIG. 2A, while the pressure plate 5 in a state free of external force has a flat plate-like shape, because of its spring property, the pressure plate 5 undergoes a large extent of elastic deformation (has high deformability) when acted upon by an external force but easily returns to its flat plate-like shape when the external force is removed.

[Depressurizing and Resin Impregnating Step]

As shown in FIG. 1B, after the molding space S is created between the bag film 6 and the mold 1, the vacuum pump 9 is driven to suction the air through the suction port 7 and thereby to depressurize the molding space S. A pressure equivalent to the difference between the pressure inside the molding space S and the atmospheric pressure outside the bag film 6 (molding load) acts on the reinforced-fiber base material 2, which is disposed inside the molding space S, through the pressure plate 5. Thus, as shown in FIG. 2B, the reinforced-fiber base material 2 deforms along the molding surface 1a of the mold 1 into an arc shape in transverse cross-section, and the pressure plate 5 having a spring property deforms into an arc shape.

When the molding space S is depressurized, since the injection port 8 is connected with the storage tank 10, the liquid resin composition R inside the storage tank 10 is injected through the injection port 8 into the molding space S being depressurized. The resin composition R having been injected into the molding space S passes successively through the pass media 4 and the release sheet 3, before impregnating the reinforced-fiber base material 2.

[Resin Curing Step]

Once a required amount of the resin composition R has impregnated the reinforced-fiber base material 2, the impregnating resin composition R is cured. If the resin composition R is a thermosetting resin, it is cured by heating of the molding space S. The molding space S is preferably maintained in a depressurized state also during the curing step of the resin composition R. Any heating device can be used for heating the resin composition R. For example, the resin composition R can be heated with a heater-embedded mat put over the bag film 6.

When the resin composition R has cured, depressurization and heating are stopped. Then, after disconnection between the suction port 7 and the vacuum pump 9 and between the injection port 8 and the storage tank 10, the release sheet 3 is separated from the cured fiber-reinforced plastic member 100, and the pass media 4, the pressure plate 5, and the bag film 6 are removed. Thereafter, the fiber-reinforced plastic member 100, which has been molded, is taken out of the mold 1.

This ends the sequence of steps for molding the fiber-reinforced plastic member 100.

[Deformation History of Pressure Plate]

Next, a deformation history of the pressure plate 5 during the above-described molding process of the fiber-reinforced plastic member 100 will be described.

Figure 2A:
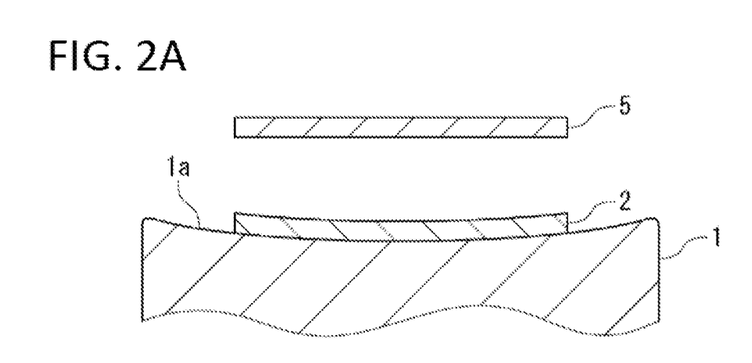
FIGS. 2A to 2C are views showing a deformation history of a pressure plate in the embodiment, in which only a mold 1, a reinforced-fiber base material 2, and a pressure plate 5 are shown in cross-section (transverse cross-section) along line X-X of FIG. 1A.
Figure 2B:
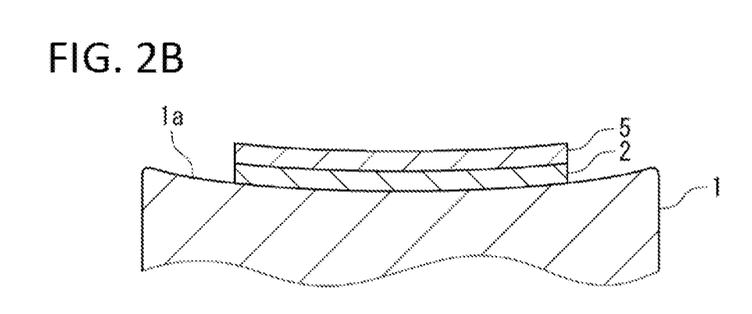
Figure 2C:
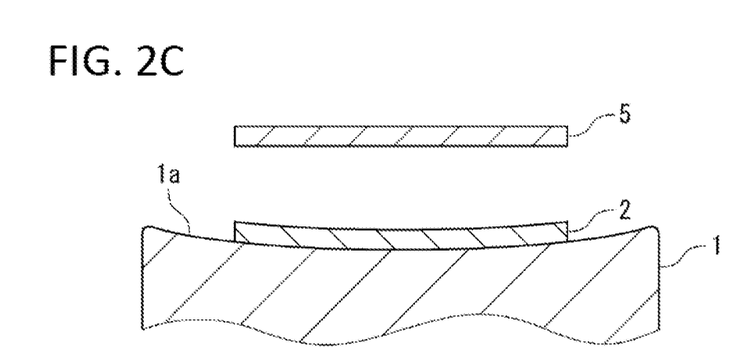

As shown in FIG. 2A, the pressure plate 5 is flat when free of external force. However, when the molding space S is depressurized after the pressure plate 5 is disposed on the reinforced-fiber base material 2, as shown in FIG. 2B, the pressure plate 5 deforms into an arc shape along the molding surface 1a of the mold 1. While the pressure plate is maintaining its arc-shaped deformation, the resin composition R impregnating the reinforced-fiber base material 2 is heated and cured. As shown in FIG. 2C, when depressurization of the molding space S is stopped after the resin composition R has cured, the pressure plate 5 resumes the state free of external force and returns from the arc shape to the flat shape.

Thus, since the pressure plate 5 is constituted of stainless steel having a spring property, the flat pressure plate 5 can be used for molding the fiber-reinforced plastic member 100 having an arc-shaped transverse cross-section. That is, a flat plate material can be used as it is as the pressure plate 5 without the need for cutting work, which allows a reduction in the production cost of the pressure plate 5.

In addition, since the pressure plate 5 easily returns to a flat shape, it can be used repeatedly for molding of the fiber-reinforced plastic members 100 to be performed later.

Figure 3A:
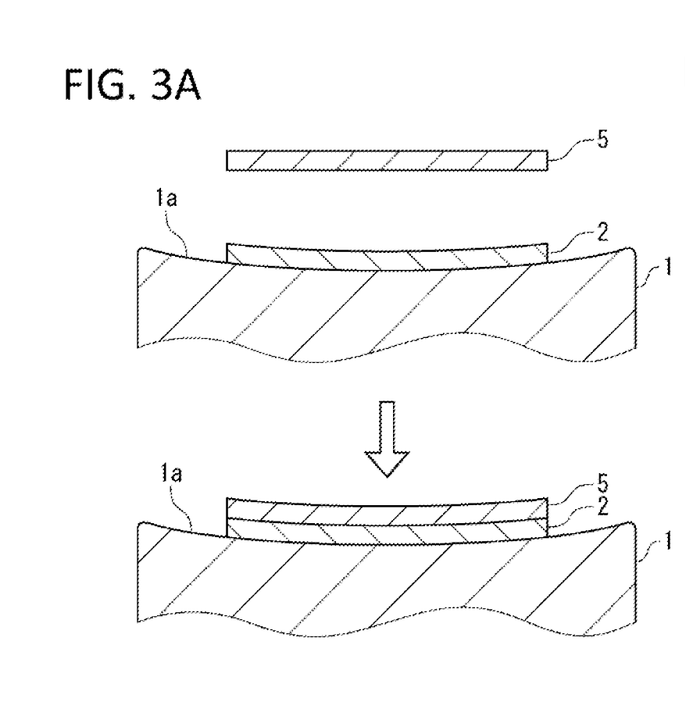
FIGS. 3A and 3B are views showing an application example of the embodiment in cross-section similar to that of FIGS. 2A to 2C.
Figure 3B:
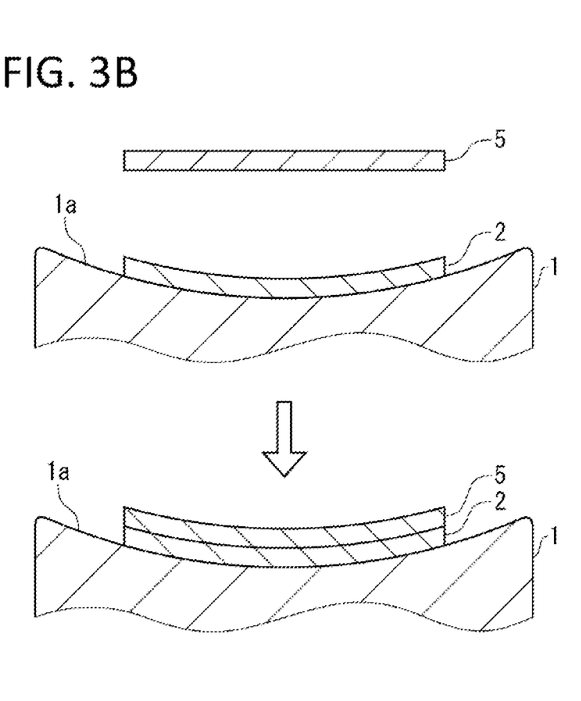

As shown in FIG. 3A and FIG. 3B, the pressure plate 5 can be commonly used for molding. Therefore, the number of types of the pressure plates 5 to be prepared for molding the fiber-reinforced plastic members 100 with different shapes can be minimized, which allows a reduction in the cost for producing or maintaining the pressure plate 5. As with FIGS. 2A to 2C, depiction of the release sheet 3 and the pass media 4 is omitted in FIGS. 3A and 3B.

Here, although in practice the release sheet 3 and the pass media 4 are present between the reinforced-fiber base material 2 and the pressure plate 5, regardless of their presence, the pressure plate 5 can deform along the mold 1. This is because the release sheet 3 and the pass media 4 are constituted of a raw material which easily deforms so as not to impair the deformability of the reinforced-fiber base material 2 and the pressure plate 5.

[Preferable Material of Pressure Plate]

The pressure plate 5 is constituted of stainless steel having a spring property.

The pressure plate 5 requires the spring property for the reason as described above. In view of the repeated use of the pressure plate 5, a stainless steel having corrosion resistance is used.

In the present invention, when the spring property is evaluated in terms of yield strength, the yield strength is preferably 500 N/mm$^2$ or higher, and more preferably 700 N/mm$^2$ or higher.

It is also preferable that the stainless steel used for the present invention is unlikely to cause the pressure plate 5 to be damaged when being demolded after curing of the resin composition R. That is because once the pressure plate 5 is damaged, its function of smoothing the surface texture of the fiber-reinforced plastic member 100 can be impaired. Therefore, the stainless steel used in the present invention has preferably a hardness of 300 Hv or higher, and more preferably 350 Hv or higher. However, instead of the stainless steel itself having a hardness of 300 Hv or higher, the surface of the pressure plate 5 may be hardened to a hardness of 300 Hv or higher by surface treatment such as heat treatment, thermal spraying, plating, and coating.

Moreover, it is desirable that the pressure plate 5 can easily elastically deform along the shape of the reinforced-fiber base material 2 and return to its original shape during the molding process of the fiber-reinforced plastic member 100. Therefore, the stainless steel used for the present invention has preferably an elastic modulus (Young's modulus) of 180×10$^3$ N/mm$^2$ or higher, and more preferably 190×10$^3$ N/mm$^2$ or higher.

Table 1 shows typical examples of stainless steels having the above mechanical properties.

TABLE 1

| | MAJOR CHEMICAL COMPOSITION [MASS %] | | | | | MECHANICAL PROPERTIES | | | |
|---|---|---|---|---|---|---|---|---|---|
| | | | | | | ELASTIC MODULES | YIELD STRENGTH | HARDNESS | |
| | C | Ni | Cr | Al | Fe | [×10$^3$ N/mm$^2$] | [N/mm$^2$] | [Hv] | REMARKS |
| JIS SUS632J1 | ≤0.09 | 6.5~7.75 | 13.5~15.50 | — | Bal. | 207 | 900/1300 | 450/550 | |
| NSS DP-2 | ≤0.08 | 1.00 3.00 | 16.00~18.00 | — | Bal. | 201 | 700/1200 | 340/420 | BY NISSHIN STEEL CO LTD |
| JIS SUS631 | ≤0.09 | 6.50~7.75 | 16.00~18.00 | 0.75~1.5 | Bal. | 186 | ≥960 | ≥345 | |
| JIS SUS431 | ≤0.2 | 1.25~2.50 | 15.00~17.00 | — | Bal. | — | ≥590 | ≥240 | |

While the preferred embodiment of the present invention has been described above, as long as within the scope of the present invention, it is possible to select some of the configurations described in the above embodiment, or to arbitrarily change some of the configurations into another configuration.

For example, the present invention can also be applied to the autoclave molding method which uses a pre-preg as a fiber-reinforced plastic raw material. The following is the outline of the steps of the autoclave molding methods:

Multiple sheets of pre-pregs are stacked on a mold, and the stacked pre-pregs and the mold are covered with a bag film. After the inside of the molding space covered with the bag film is depressurized and the air is exhausted, the mold with the pre-pregs and the bag film placed on it is carried into an autoclave. When the inside of the autoclave is pressurized while the inside of the bag film is being depressurized, the inside of the molding space is pressurized through the bag film (which works as a molding load). When the pressure is increased to a predetermined pressure, the temperature inside the autoclave is raised from the room temperature to the curing temperature of the resin. After the curing temperature is reached, the inside of the autoclave is held at this temperature for a predetermined time. After the holding time has passed, the temperature of the inside of the autoclave is lowered to a predetermined temperature. The pressure of the inside of the autoclave is also lowered. Meanwhile, the pressure of the inside of the bag film can be made equal to the atmospheric pressure at an appropriate temperature.

Thereafter, the mold is carried out of the autoclave and the fiber-reinforced plastic member is removed from the mold.

The pressure plate of the present invention can be also applied to the above autoclave molding method, in which a pressure plate is sometimes interposed between the pre-preg and the bag film.

While this embodiment uses a thermosetting resin as the matrix resin, the present invention can also use a thermoplastic resin. When a thermoplastic resin is used as the matrix resin, the matrix resin can be melted and injected into the molding space to impregnate the reinforced-fiber base material, and then be cooled and cured.

The arc-shaped transverse cross-sectional shape of the fiber-reinforced plastic member 100 is a mere example, and the present invention can also be applied to other transverse cross-sectional shapes including, for example, a stepped transverse cross-sectional shape. Moreover, the above embodiment shows the example where the pressure plate 5 deforms along the shape of the transverse cross-section of the fiber-reinforced plastic member 100, but the present invention also encompasses the case where the pressure plate 5 deforms along the shape of the longitudinal cross-section.

What is claimed is:

1. A method for molding a fiber-reinforced plastic member, comprising the steps of:
    disposing a fiber-reinforced plastic raw material inside a molding space, which is created between a mold and a covering material, so as to face the mold, and disposing a flat pressure plate made of spring steel between the fiber-reinforced plastic raw material and the covering material;
    applying a molding load to the inside of the molding space; and
    curing a resin composition contained in the fiber-reinforced plastic raw material,
    wherein the mold has a molding surface, at least a portion of which is substantially arcuate in shape, and in the step of applying the molding load to the inside of the molding space, the pressure plate elastically deforms along the molding surface of the mold.

2. The method according to claim 1, wherein the spring steel is constituted of a stainless steel having at least one of the following mechanical properties:
    a yield strength of 500 N/mm$^2$ or higher;
    a hardness of 300 Hv or higher; and
    a longitudinal elastic modulus of 180×10$^3$ N/mm$^2$ or higher.

3. The method according to claim 1, wherein the spring steel is constituted of a stainless steel having a mechanical property of a hardness of 350 Hv or higher.

4. The method according to claim 1, wherein the spring steel is constituted of a stainless steel having at least one of the following mechanical properties:
    a yield strength of 700 N/mm$^2$ or higher;
    a hardness of 350 Hv or higher; and
    a longitudinal elastic modulus of 190×10$^3$ N/mm$^2$ or higher.

5. The method according to claim 1, wherein the spring steel is constituted of a stainless steel having the following mechanical properties:
    a yield strength of 700 N/mm$^2$ or higher;
    a hardness of 350 Hv or higher; and
    a longitudinal elastic modulus of 190×10$^3$ N/mm$^2$ or higher.

6. A method for molding a fiber-reinforced plastic member, comprising:
    a disposing step of placing a reinforced-fiber base material on a mold;
    a covering step of covering the reinforced-fiber base material placed on the mold with a covering material;
    a depressurizing step of depressurizing the inside of the molding space, which works as a molding load;
    a resin impregnating step of supplying a resin composition in a fluidized state into the depressurized molding space and impregnating the reinforced-fiber base material with the resin composition; and
    a resin curing step of heating and curing the resin composition, wherein
    in the covering step, a flat pressure plate made of spring steel is disposed between the reinforced-fiber base material and the covering material,
    wherein the mold has a molding surface, at least a portion of which is substantially arcuate in shape, and in the step of applying the molding load to the inside of the molding space, the pressure plate elastically deforms along the molding surface of the mold.

7. The method according to claim 6, wherein the spring steel is constituted of a stainless steel having at least one of the following mechanical properties:
    a yield strength of 500 N/mm$^2$ or higher;
    a hardness of 300 Hv or higher; and
    a longitudinal elastic modulus of 180×10$^3$ N/mm$^2$ or higher.

8. The method according to claim 6, wherein the spring steel is constituted of a stainless steel having a mechanical property of a hardness of 350 Hv or higher.

9. A method for molding a fiber-reinforced plastic member, comprising:
    a disposing step of placing a pre-preg, which contains a fiber base material and a matrix resin composition, as a fiber-reinforced plastic raw material, on a mold;
    a covering step of covering the pre-preg placed on the mold with a covering material;
    a depressurizing step of depressurizing the inside of the molding space and exhausting the air; and
    a resin curing step of pressurizing the inside of the molding space through the covering material, which works as a molding load, and at the same time heating and curing the resin composition of the pre-preg, wherein in the covering step, a flat pressure plate made of spring steel is disposed between the pre-preg and the covering material, wherein the mold has a molding surface, at least a portion of which is substantially arcuate in shape, and in the step of applying the molding load to the inside of the molding space, the pressure plate elastically deforms along the molding surface of the mold.

10. The method according to claim 9, wherein the spring steel is constituted of a stainless steel having at least one of the following mechanical properties:

a yield strength of 500 N/mm$^2$ or higher;
a hardness of 300 Hv or higher; and
a longitudinal elastic modulus of 180×10$^3$ N/mm$^2$ or higher.

11. The method according to claim 9, wherein the spring steel is constituted of a stainless steel having a mechanical property of a hardness of 350 Hv or higher.

* * * * *